United States Patent [19]

Hetz

[11] 4,387,732

[45] Jun. 14, 1983

[54] STEAM TRAP INCLUDING INTERCHANGEABLE BODY MEMBER AND INSERT ASSEMBLY

[75] Inventor: Heinz K. Hetz, Holicong, Pa.

[73] Assignee: YWHC, Inc., Wilmington, Del.

[21] Appl. No.: 261,089

[22] Filed: May 7, 1981

Related U.S. Application Data

[60] Division of Ser. No. 829,008, Aug. 30, 1977, Pat. No. 4,288,032, which is a continuation-in-part of Ser. No. 629,649, Nov. 6, 1975, abandoned.

[51] Int. Cl.³ .............................................. F16T 1/16
[52] U.S. Cl. ..................................... 137/183; 236/56
[58] Field of Search ..................... 137/183, 454.5, 271; 236/56, 59

[56] References Cited

U.S. PATENT DOCUMENTS

| | | | |
|---|---|---|---|
| 2,084,470 | 6/1937 | Wells | 236/56 |
| 2,649,277 | 8/1953 | Blackford | 137/454.5 X |
| 3,197,141 | 7/1965 | Johnson | 236/56 |
| 3,347,258 | 10/1967 | Judsen et al. | 137/183 |
| 3,536,090 | 10/1970 | Scott | 137/183 |
| 3,664,363 | 5/1972 | Migawaki | 137/183 |
| 3,718,350 | 2/1972 | Klein | 285/DIG. 72 |
| 3,720,223 | 3/1973 | Goellner | 137/183 |
| 3,724,751 | 4/1973 | Fujiwara | 137/183 X |
| 3,807,429 | 4/1974 | Breton | 137/183 |

*Primary Examiner*—Alan Cohan
*Attorney, Agent, or Firm*—John W. Logan, Jr.

[57] ABSTRACT

A valve body member and various insert assemblies usable with the body member to form steam traps of different types are disclosed in this application. The body member includes an internally threaded, generally cylindrical recess extending inwardly from an outer surface and terminating in an end face, an inlet passage communicating with the recess through a passageway terminating in the end face of the recess, and a discharge passage also communicating with the recess. An annular rib is formed on the end face of the recess around the passageway and includes a surface on which is seated a first sealing ring clamped in place by a first bearing surface of the particular insert assembly used to form the steam trap; an annular seat is formed on the outer surface of the body member around the cylindrical recess and this seat receives a second sealing ring which is clamped in place by a second bearing surface of the insert assembly. All of the insert assemblies further include a threaded portion that cooperates with the internally threaded portion of the recess to retain the insert assembly and the body member in assembled relationship. Certain of the insert assemblies include a plurality of parts which are retained in assembled relationship by a retaining ring arrangement to facilitate assembly and disassembly of the insert assembly, and the body member and all of the insert assemblies are arranged to retain the first sealing ring adjacent the first bearing surface to facilitate removal and insertion of the first sealing ring on the annular rib.

7 Claims, 5 Drawing Figures

STEAM TRAP INCLUDING INTERCHANGEABLE BODY MEMBER AND INSERT ASSEMBLY

This application is a division of application Ser. No. 829,008 filed Aug. 30, 1977, now U.S. Pat. No. 4,288,032 issued Sept. 8, 1981, which application is a continuation-in-part of application Ser. No. 629,649, filed Nov. 6, 1975 now abandoned.

This invention relates to steam traps and more particularly to valve bodies usable interchangeably with various insert assemblies to form steam traps of different types.

Various types of steam traps are utilized to remove condensate and gases from steam lines, the type used in any particular system being dependent on the requirements of the system. The more commonly used steam traps can be classified as thermodynamic traps, operating in response to the difference in the thermodynamic energy available from steam and condensate, or thermostatic traps, operating in response to temperature changes in the steam line.

Thermodynamic steam traps generally include a valve body including a seat between inlet and outlet openings and a valve member that cooperates with the seat to allow or prevent flow. The valve member may be of various types, for example, a disc, piston or lever, and rides in a control chamber which receives incoming flow when the valve is open, the pressure developed by the condensate keeping the valve open when no steam is present in the trap. When the temperature of the condensate approaches that of the steam, the condensate flowing to the control chamber experiences a pressure drop which causes "flashing" of the condensate to steam. Rapid expansion of the steam occurs in the control chamber which exerts a force on the valve member causing it to close.

Thermostatic steam traps generally include a valve body including a seat between inlet and outlet openings and a valve member that cooperates with the seat to allow or prevent flow. The valve member is carried in a control chamber that receives incoming flow whether the valve is open or closed. The valve member is responsive to and usually carried by a temperature sensitive device located in the control chamber. One type of temperature sensitive device used is a bellows member filled with fluid having a boiling point lower than that of water. Depending on the temperature of the incoming flow, the bellows will contain liquid and remain in an open position or will contain vapor, expanding the bellows and closing the valve.

From the preceding description of the more commonly used steam traps, it should be understood that different types involve significantly different structure. Thus, when replacing an existing trap with a trap of a different type, it is usually necessary to disconnect and remove the existing trap from its associated piping and replace it with the new trap. Obviously, this is somewhat expensive because of the large amount of time required to effect the replacement and since a complete new trap must be purchased and an entire trap discarded. Replacement of a worn-out trap with a new trap of the same type may be expensive for the same reasons. Moreover, certain manufacturing costs for a line of different type steam traps include redundancies tending to raise the cost of each type of trap. For example, each type of trap requires design and tooling costs for a complete new structure. Finally, additional inventory costs can result if a stock of functionally equivalent, but structurally different parts of each type of trap is maintained.

Replacement of a worn-out trap with a trap of the same type may be accomplished by replacing the valve member and certain associated apparatus while leaving the valve body in place. The associated apparatus that is replaced along with the valve member usually includes a bonnet and a plurality of sealing members, one of which is located interiorly of the valve body. As a consequence the manipulation of a plurality of parts impairs the efficiency of the replacement technique. In addition, removal of the interiorly located sealing ring can present problems impairing the efficiency of the replacement technique. These problems result from the fact that the interiorly located sealing ring is usually exposed to hot condensate and steam which can pit and corrode the ring, causing it to break into several pieces or to adhere to the interior of the valve body. Thus, removal of the interiorly located sealing ring may require extensive manipulation.

Accordingly, it is the object of this invention to provide a body member which may be interchangeably used with various insert assemblies to provide different types of steam traps.

It is another object of this invention to provide various valve type insert assemblies usable with a standardized body member to form different types of steam traps which are relatively economical to manufacture.

It is yet another object of this invention to provide steam traps with easily removable and replaceable insert assemblies.

Finally, it is yet another object of this invention to provide various types of steam traps that include interchangeable parts, are relatively low cost, rugged, and economical to manufacture.

These and other objects of this invention are accomplished by providing a valve type of body member including an internally threaded generally cylindrical recess extending inwardly from an outer surface and terminating in an annular end face. Inlet and outlet passage means are provided in the body member for communication with the recess, the former including a passageway terminating in the end face of the recess. Formed on the end face of the recess around the passageway is an annular rib including a surface on which is received a first sealing ring clamped in place by a first bearing surface provided on valve type insert assemblies when the steam trap is assembled. In addition, the outer surface of the body member is formed with a seat extending around the recess which receives a second sealing ring which is clamped in place by a second bearing surface on the insert assemblies when the steam trap is assembled. In addition to the bearing surfaces, the various insert assemblies also include a threaded portion that cooperates with the internally threaded portion of the recess to retain the assemblies and the body members in assembled relationship and a wrenching configuration.

Certain of the insert assemblies include a plurality of parts retained in assembled relationship to facilitate assembly and disassembly of an insert assembly with a body member. All of the insert assemblies are arranged to retain the first sealing ring adjacent the first bearing surface to facilitate removal and insertion of the sealing ring of the annular rib.

For a better understanding of the invention, reference is made to the following description of several preferred embodiments thereof taken in conjunction with the figures of the accompanying drawing, in which.

Figure 1:
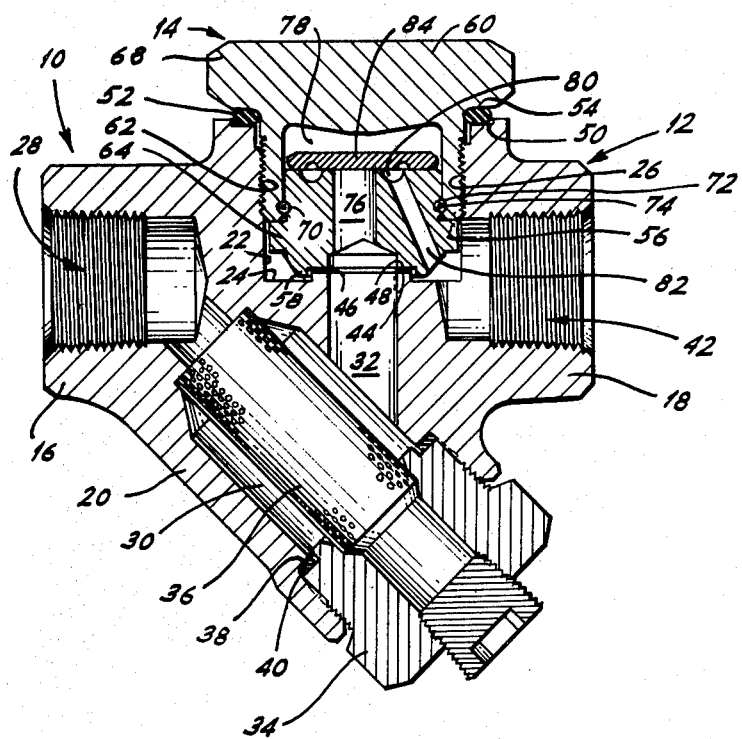
FIG. 1 is a side elevational view in section of a preferred embodiment of a thermodynamic steam trap in accordance with this invention.

Referring to FIG. 1 of the drawing there is illustrated a thermodynamic steam trap 10 including a valve body member 12 and a valve insert assembly 14 for controlling flow across the body member. In the embodiment of the invention disclosed here, the valve body member 12 is of the Y type and, accordingly, includes an inlet portion 16, an outlet portion 18, and a leg portion 20 extending at an angle to the inlet and outlet portions. It should be particularly understood, however, that any suitable configuration can be utilized. Intermediate the inlet and outlet portions, the body member is formed with a generally cylindrical recess 22 extending inwardly from an outer surface thereof and terminating at an annular end face 24 located internally of the body member. A portion of the cylindrical wall forming the recess 22 is formed with threads 26 for receiving and securing the insert 14 to the body member 12 as will be fully explained hereinafter.

An inlet passage is formed in the body member 12 and includes a first passageway 28 formed in the inlet portion 16, a second passageway 30 formed in the leg portion 20 and a third passageway 32 extending upwardly from the second passageway at a generally right angle to the first passageway and which terminates in the end face 24. Accordingly, the inlet passage communicates between an inlet pipe to which the body member 12 is secured and the recess 16. The passageway 30 is formed with a threaded portion adjacent its free end which cooperates with a threaded portion of a cap member 34 which clamps a strainer 36 in the second passageway. The strainer 36 is a perforated cylindrical member arranged so that incoming fluid flows through the interior of the member, through the perforations and then through passageway 32. As is usual in the art, the cap member 34 can be removed periodically so that the strainer 36 can be removed and cleaned. Spaced inwardly of the free end of the leg portion 20 is formed a seat 38 in the form of an annular recess in which is received a sealing member 40 clamped in place by the end face of the cap member 34.

Also formed in the body member 12 is an outlet passage which is in the form of a passageway 42 that communicates with the recess 22 through the sidewall and the end face 24. The passageway 42 is suitably adapted to be connected to an outlet pipe connected to the steam system.

The end face 24 of the recess 22 is formed with an annular rib member 44 having a surface which extends about the inlet passageway 32. On the surface of the rib member is seated a sealing ring 46 clamped in place by a bearing surface 48 on insert assembly 14. The outer surface of the body member is formed with a seat 50 in the form of an annular recess extending around the cylindrical recess 22. A sealing ring 52 is located in the seat 50 and is clamped in place by another bearing surface 54 on the valve insert assembly 14.

Figure 5:
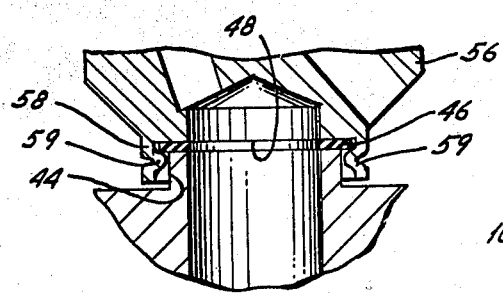
FIG. 5 is an enlarged sectional view of a portion of an insert assembly and sealing ring usable with all embodiments of this invention.

As noted previously, the steam trap disclosed in FIG. 1 of the drawing is a thermodynamic trap. It is noted that it is a disc type trap. Thus, the valve insert assembly 14 disclosed in FIG. 1 includes a valve insert member 56 formed with a recess at one end which forms the bearing surface 48 and a depending skirt 58 surrounding the bearing surface. When assembled, the bearing surface 48 seats on the sealing ring 46 and the skirt 58 extends about the side walls of the rib member 44. Referring briefly to FIG. 5 of the drawing, it can be seen that adjacent its free end surface the skirt 58 is formed with radially inwardly projecting protuberances 59. The protuberances 59 extend inwardly a sufficient distance to retain the sealing ring 46 within the skirt 58 and adjacent the bearing surface 48 such that the sealing ring is captivated by the valve insert member 56. The inner diameter of the skirt 58 and of a circle defined by the inner ends of the protuberances 59 is larger than the outer diameter of the rib member 44 so that the valve insert member 56 does not interfere with the clamping of the sealing rib 46 on the top surface of the rib member. With this arrangement it should be clear that during assembly and disassembly of the valve insert assembly 14 and the body member 12, the sealing ring 46, carried by the insert member 56, is automatically located on or removed from the rib member 44. In the event the sealing ring 46 breaks, the removal of the broken pieces is facilitated. That is, some of the pieces are removed with the insert member 56 and any remaining pieces should be located on the top surface of the rib member 44 where they are more accessible than if they were located in a recess formed around the passageway 32.

The valve insert member is retained in assembled relationship with the body member 12 by a bonnet 60 including a cylindrical portion formed with threads 62 that cooperate with the threads 26 formed in the recess 22 and which further includes a bearing surface on the free end of the cylindrical portion that bears on flange 64 formed on the valve insert member. At the upper end of its cylindrical portion, the bonnet 60 is formed with a radially projecting flange 68 providing the bearing surface 54 that clamps the sealing ring 52 in its seat 50. The flange 68 also is formed with a wrenching configuration around its periphery to accommodate a tool used to assemble or disassemble the insert assembly 14 with the body member 12. Further facilitating the assembly and disassembly of the insert assembly 14 and the body member 12, the insert member 56 includes a cylindrical portion snugly received in the cylindrical portion of the bonnet 60. The outer wall of the former includes an annular groove 70 and the inner wall of the latter includes an annular groove 72 which grooves are adjacent each other when the bonnet 60 seats on the valve insert member 56 and which receive a retaining ring 74 operative to normally retain the bonnet and the valve insert member in assembled relationship. Sufficient axial force applied to the assembly will compress the retaining ring 74 and allow the bonnet and the valve insert member to slide relative to one another to permit disassembly. From the preceding, it can be seen that the valve insert assembly 14 includes the bonnet 60 which is retained with the insert 56, which, in turn, is retained with the sealing ring 46 and it can be appreciated that the assembly and disassembly of the insert assembly 14 with the body member 12 is facilitated.

Completing the description of this embodiment of the invention, the valve insert member 56 further includes an inlet passage 76 that communicates with the inlet passage 32 and a control chamber 78 formed between the top of the insert member amd the bonnet. The inlet passage 76 is slightly offset from the central axis of the insert member in the preferred embodiment of the invention disclosed herein, but can be centrally located along that axis. The top face of the valve insert member 56 is formed with an annular passage 80 and a plurality of outlet passages 82 communicating between the control chamber and the outlet passage 42. Overlying the top, as viewed in the drawing, face of the valve insert member 56 is a disc member 84 that overlies the inlet passage 76 but which is movable in the control chamber 78 to an open position with respect to the inlet passage. Finally, for a purpose to be explained, the inner top wall of the bonnet 60 is formed with tapered surfaces.

Operation of the steam trap 10 is generally conventional and will now be explained. The disc member 84 is normally seated across the inlet passage 76 in the valve insert member 56 and upon startup of the steam system fluid in the form of condensate and gases flows through the inlet passage, that is, the first passageway, the strainer 34, the second passageway 30 and the third passageway 32, through the inlet passageway 76 against the exposed surface of the disc member 84. The pressure exerted by the condensate and gases pivots the disc member about the edge spaced farthest from the inlet passage 76 to an open position with the disc bearing on one of the tapered surfaces of the bonnet 60. The condensate and gases are deflected by the bottom of the disc member 84, flows through the outlet passages 82 and through the outlet passageway 42, where it is discharged through a discharge pipe. When very hot condensate approaching steam temperature and steam flows to the trap, it follows the same path into the control chamber 78 and the steam flows upwardly onto the top surface of the disc member 84, causing a pressure drop on the bottom side of the disc member such that condensate on the bottom side of the disc member flashes to steam which flows upwardly above the top surface of the disc, causing a pressure build-up which snaps the disc member back across the inlet passage 76, stopping the flow of steam through the trap. As the steam in the control chamber condenses, the condensate leaks under the disc member 84 into the annular passage 80 and through the outlet passages 82. When the pressure in the control chamber has dropped sufficiently, the disc member is again lifted and the process repeats.

As will now be explained with reference to FIG. 2 of the drawing, a different type of steam trap 10a can easily be provided by utilizing the same valve body 12 disclosed in FIG. 1 of the drawing and by replacing the valve insert assembly 14 with a different insert assembly 14a. Since the valve body member disclosed in FIG. 2 of the drawing is the same as that disclosed in FIG. 1, it will not be redescribed and when referred to, the same reference numerals will be used. Further, certain portions of the insert assembly 14a are generally similar to portions of the insert assembly 14 disclosed in FIG. 1 of the drawing and will be referred to with like reference numerals including the suffix a.

The insert assembly 14a includes a valving arrangement responsive to temperature conditions of the incoming flow and, accordingly, the steam trap 10a is a thermostatic type of trap. The insert assembly includes a valve insert member 56a formed with a recess at one end which forms a bearing surface 48a and an axially extending skirt 58a surrounding the bearing surface. Similar to the embodiment disclosed in FIG. 1 of the drawing, when the insert member 56a is assembled with the body member 12, the bearing surface 48a cooperates with the rib 44 to clamp the sealing ring 46 in place and the skirt 58a extends about the side walls of the rib and also the sealing ring. Although not clearly seen in FIG. 2 of the drawing, the free end of the skirt 58a is formed with protuberances 59 in accordance with FIG. 5 of the drawing to retain the sealing ring 46 with the insert assembly 14a. The insert member 56a includes a generally cylindrical portion formed with threads 62a that cooperate with the threads 26 formed in the recess 22 to retain the insert and valve member in assembled relationship and which exert the clamping force between the bearing surface 48a and the top surface of the rib 44. Adjacent the cylindrical portion of the insert member 56a, a radially projecting flange 68a is provided and forms the bearing surface 54a that clamps the sealing ring 52 in the seat 50 formed on the valve body 12. The flange 68a is formed with a wrenching configuration around its periphery to accommodate a tool used to assemble or disassemble the insert assembly 14a with the body member 12.

Extending through the cylindrical portion of the insert member 56a is an inlet passage 76a that communicates with the third passageway 32 formed in the valve body member 12 and with a control member 78a formed in the insert member radially adjacent the flange portion 68a. Also formed in the cylindrical portion is an outlet passage 82a that communicates with the control chamber 78a at a centrally disposed location and with the outlet passageway 42 formed in the body member 12. A valve member 84a is located in the control chamber 78a and is centrally disposed to cooperate with the outlet passage 82a to admit or prevent the flow of fluid through the insert member 56a. Attached to the valve member 84a for controlling its position is a temperature sensitive device which, in the preferred embodiment disclosed herein, is a bellows member 86 which is adapted to expand and contract in the axial direction. The bellows member is carried on its upper end by a threaded stem 88 secured to a spider arrangement 90 carried in the upper portion of the insert member 56a. Covering the upper end of the insert member 56a is a bonnet 60a which forms the end of the control chamber 78a.

As is usual, the bellows member 86 carries a fluid having a boiling point somewhat less than that of water and can conveniently include a water and alcohol mixture. When the fluid in the bellows is in a liquid state, the bellows is in a contracted position and the valve member 84a is spaced from the outlet passage 82a. When the temperature in the control chamber 78a is sufficiently high, the fluid in the bellows 86 vaporizes and exerts a significantly higher pressure on the bellows which expands the bellows causing the valve member 84a to seat on the outlet passage 82a.

From the foregoing, the operation of this type of steam trap should be clear. When the system is started, fluid in the form of condensate and gases flows through the valve body member in the same manner described with respect to FIG. 1 and through the pasage 76a into the control chamber 78a. Since the temperature of the condensate and gases is insufficient to vaporize the fluid in the bellows 86, the fluid flows through the outlet passage 82a and through the outlet passage 42 formed in the valve body member 12. When very hot condensate and steam flow through the trap, the temperature in the control chamber 78a is raised sufficiently to vaporize the fluid in the bellows 86, causing the bellows to expand and the valve member 84a to cover the outlet passage 82a, preventing flow across the trap.

Figure 2:
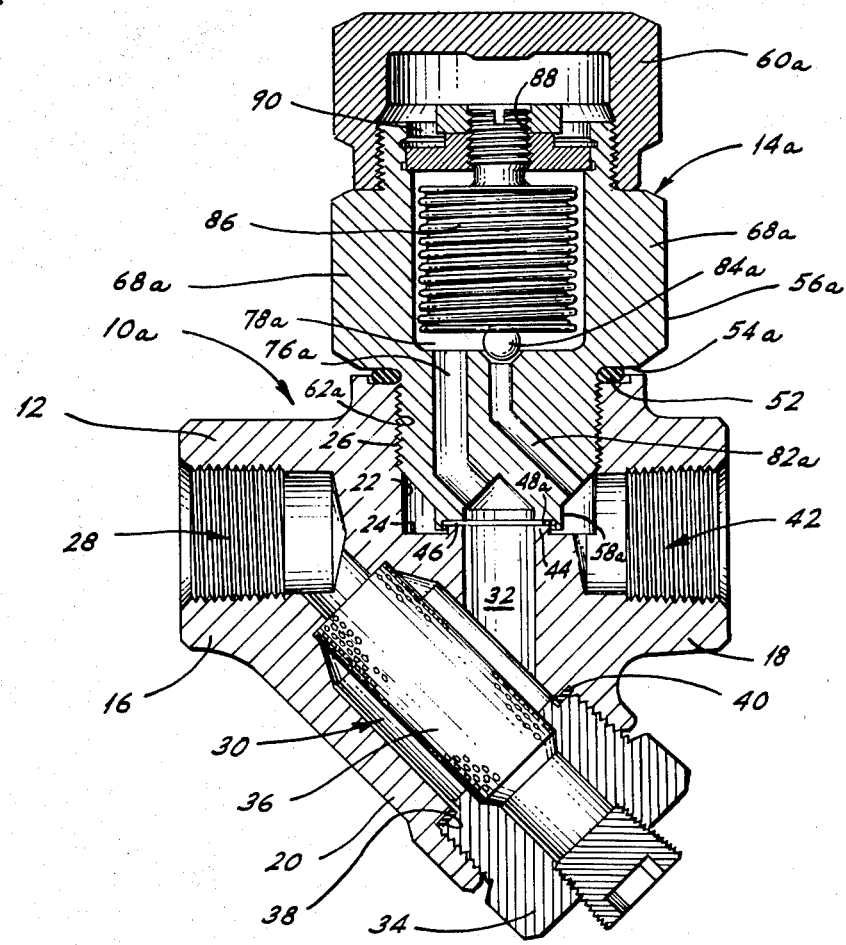
FIG. 2 is a side elevational view in section of a preferred embodiment of a thermostatic steam trap in accordance with this invention.
Figure 3:
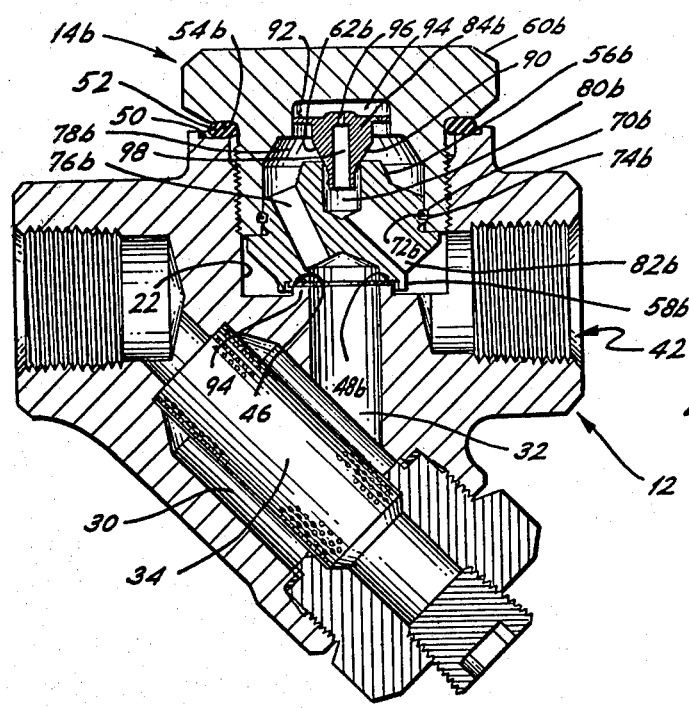
FIG. 3 is a side elevational view in section of a preferred embodiment of another thermodynamic steam trap in accordance with this invention.

Referring now to FIG. 3 of the drawing, a different type of thermodynamic steam trap 10b is illustrated, and it should be understood that this trap can be provided by utilizing the same valve body 12 disclosed in FIGS. 1 and 2 of the drawing and by replacing the valve insert assemblies 14 and 14a with a somewhat different type of insert assembly 14b. Since the valve body member 12 disclosed in FIG. 3 of the drawing is the same as that disclosed in FIG. 1, it will not be redescribed and when referred to, the same reference numerals utilized in FIG. 1 will be utilized here. Further, certain portions of the insert assembly 14b are generally similar to portions of the insert assembly 14 disclosed in FIG. 1 of the drawing and will be referred to with like reference numerals including the suffix b.

The insert assembly 14b includes a valving arrangement that is responsive to the difference in the thermodynamic energy available for steam and condensate. That is, it is a thermodynamic trap. The insert assembly 14b includes a valve insert member 56b with a recess at one end which forms a bearing surface 48b and an axially extending skirt 58b surrounding the bearing surface. Similar to the embodiment disclosed in FIG. 1 of the drawing, when the insert member 56b is assembled with the body member 12, the bearing surface 48b cooperates with the rib 44 to clamp the sealing ring 46 in place and the skirt 58b extends around the sidewalls of the rib and also the sealing ring. Similar to the previous two described embodiments, the free end of the skirt 58b is formed with protuberances 59 in accordance with FIG. 5 of the drawing to retain the sealing ring 46 with the insert assembly 14b. The valve insert member 56b is retained in assembled relationship with the body member 12 by a bonnet 60b including a cylindrical portion formed with threads 62b that cooperate with the threads 26 formed in the recess 22 and which further includes a bearing surface on the free end of the cylindrical portion that bears on flange 64b formed on the valve insert member. At the upper end of its cylindrical portion, the bonnet 60b is formed with a radially projecting flange 68b providing the bearing surface 54b that clamps the sealing ring 52 in the seat 50. The flange 68b also is formed with a wrenching configuration around its periphery to accommodate the tool used to assemble or disassemble the insert assembly 14 with the body member 12. Further facilitating the assembly and disassembly of the insert assembly 14b in the body member 12, the insert member 56b includes a cylindrical portion snugly received in the cylindrical portion of the bonnet 60b. The outer wall of the former includes an annular groove 70b and the inner wall of the latter includes an annular groove 72b, which grooves are adjacent each other when the bonnet 60 seats on the valve insert member 56b and which receive a retaining ring 74b operative to normally retain the bonnet and the valve insert member in assembled relationship. Axial force applied to the assembly will be sufficient to compress the retaining ring 74b and allow the bonnet and valve insert member to slide relative to one another to permit disassembly.

The valve insert member 56b further includes an inlet passage 76b that communicates with the inlet passage 32 and a control chamber 78b formed between the top of the insert member and the bonnet. The inlet passage 76b extends through the insert member at an angle to the longitudinal axis thereof. The top face of the valve insert member 56b is formed with a central bore 80b that communicates between the control chamber 78b and an outlet passage 82b that communicates with the outlet passage 42. A piston member 84b is located in the control chamber and is formed with an inclined valve surface 90 that cooperates with the periphery of the passage 80b to allow or prevent the flow of hot condensate from the inlet passage 76b through the control chamber 78b to the outlet passage 82b. Adjacent its upper end, the piston member 84b is formed with a flange 92 located in a recessed control chamber 94 formed in the top of the bonnet. The outer diameter of the piston 92 is just slightly less than the inner diameter of the control chamber 94 so that an orifice is provided allowing the passage of steam or very hot condensate from the control 78b to the control chamber 94. Extending axially through the piston member 84b is a second orifice 96 and a flow passage 98 so that the hot condensate and steam located in the control chamber 94 can be discharged to the outlet passage 82b.

Operation of the steam trap disclosed in FIG. 3 of the drawing is generally conventional. The piston member 84b is normally seated such that the inclined surface 90 bears on the outer periphery of the passage 80b formed in the valve insert member 56b and upon startup of the steam system, fluid in the form of condensate and gases flow through the inlet passage, that is, the first passageway, the strainer 34, the second passageway 30 and the third passageway 32, through the inlet passage 76b to the control chamber 78b where it exerts pressure against the bottom surface of the flange 92. The pressure exerted by the condensate and gases raises the piston member 84b upwardly, as viewed in the drawing, so that inclined valve surface 90b no longer bears on the periphery of the passage 80b whereby the condensate and gases can pass to the outlet passage 82b. Concurrent with this flow, some of the condensate and gases flow through the orifice formed between the flange 92 and the inner periphery of the control chamber 94 into the control chamber 94 experiencing a first pressure drop and then through the second orifice 96 into the passage 98 experiencing a second pressure drop. From the passage 98, the fluid from the control chamber 94 is discharged through the passages 80b and 82b. The pressure drop across the first orifice is such that the pressure exerted on the top surface of the flange 92 is not sufficient to close the valve.

As the temperature of the condensate and gases approaches the steam temperature, the pressure drops are such that the condensate discharged to the second orifice 96 is sufficiently hot to flash to steam at the pressure at the discharge side of the second orifice. When the condensate flashes to steam, it expands significantly and chokes the flow of condensate from the control chamber 94 through the orifice 96, causing a pressure increase in the control chamber 98 which offsets the pressure acting on the inlet side of the flange 92. At this point the piston member 84b moves toward the passage 78b until the inclined surface 90 bears on the periphery of the passage 80b closing the valve. As long as the temperature of the condensate is high enough to allow the condensate to flash to steam, the valve remains closed; if, however, the temperature of the condensate drops, the flashing is discontinued and the pressure in the control chamber 98 is relieved, allowing the pressure on the inlet side of the flange 92 to lift the piston member 84b, opening the valve. Condensate now flows through the trap as described above until it again flashes to steam as also described above. It is merely noted that the operation of the trap disclosed in FIG. 3 of the drawing could, if desired, be arranged such that the flashing of the condensate into steam occurs across the first orifice formed between the flange 92 and the inner periphery of the control chamber 98. In this event, the flashing of steam would occur in the control chamber 98, increasing the pressure and closing the valve.

Figure 4:
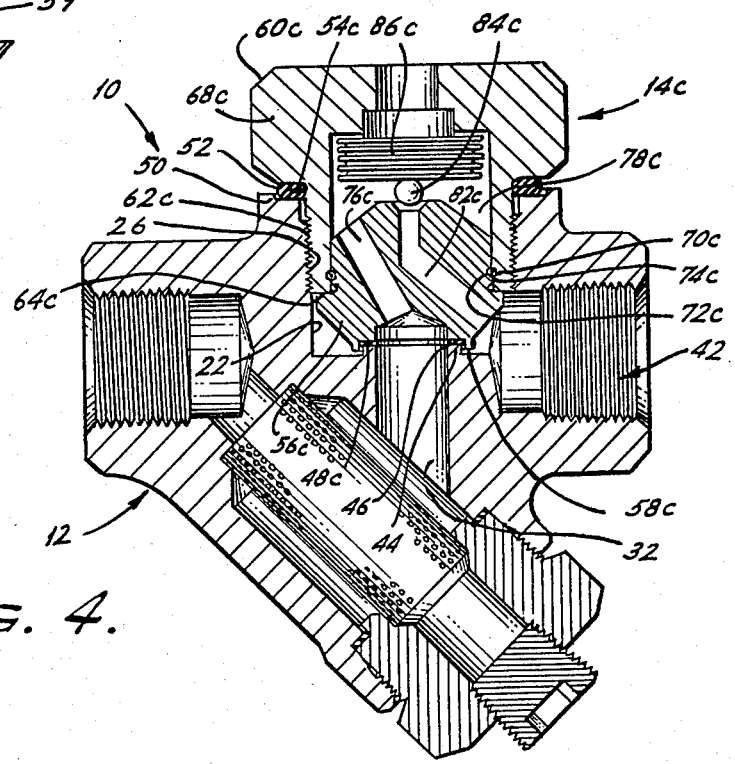
FIG. 4 is a side elevational view in section of a preferred embodiment of another thermostatic steam trap in accordance with this invention.

Referring now to FIG. 4 of the drawing, it can be seen that a different type of thermostatic steam trap can easily be provided by utilizing the same valve body 12 disclosed in FIG. 1 of the drawing and by replacing the valve insert assembly 14 with a different insert assembly 14c. Since the valve body member disclosed in FIG. 4 of the drawing is the same as that disclosed in FIG. 1, it will not be redescribed and when referred to, the same reference numerals will be utilized. Further, certain portions of the insert assembly 14c are generally similar to portions of the insert assembly 14, 14a and 14b disclosed in FIGS. 1, 2 and 3 of the drawing, respectively, and will be referred to with like reference numerals including the suffix c.

The insert assembly 14c includes a valving arrangement responsive to temperature conditions of the incoming flow and, accordingly, the steam trap 10c is a thermostatic type of trap. The insert assembly includes a valve insert member 56c formed with a recess at one end which forms a bearing surface 48c and an axially extending skirt 58c surrounding the bearing surface. Similar to the embodiment disclosed in FIG. 1 of the drawing, when the insert member 56c is assembled with the body member 12, the bearing surface 48c cooperates with the rib 44 to clamp the sealing ring 46 in place and the skirt 58c extends about the sidewalls of the rib and also the sealing ring. Again, the free end of the skirt 58c is formed with protuberances 59 in accordance with FIG. 5 of the drawing to retain the sealing ring 46 with the insert assembly 14c.

The valve insert member 56c is retained in assembled relationship with the body member 12 by a bonnet 60c including a cylindrical portion formed with threads 62c that cooperate with the threads 26 formed in the recess 22 and which further includes a bearing surface on the free end of the cylindrical portion that bears on a flange 64c formed on the vave insert member. At the upper end of its cylindrical portion, the bonnet 60c is formed with a radially projecting flange 68c providing the bearing surface 54c that clamps the sealing ring 52 in its seat 50. The flange 68c also is formed with a wrenching configuration around its periphery to accommodate a tool used to assemble or disassemble the insert assembly 14c with the body member 12. Similar to the previous embodiments of the invention, the insert member 56c includes a cylindrical portion snugly received in the cylindrical portion of the bonnet 60c and the outer wall of the former includes an annular groove 70c and the inner wall of the latter includes an annular groove 72c which cooperate with a retaining ring 74c to normally retain the bonnet and the valve insert member in assembled relationship.

Extending through the cylindrical portion of the insert member 56c is an inlet passage 76c that communicates with the passageway 32 formed in the valve body member 12 and with a control chamber 78c formed in the insert member between the upper surface of the insert member and the upper surface of the bonnet member 60c. Also formed in the cylindrical portion is an outlet passage 82c including an axially extending portion communicating with the control chamber 78c and an angled portion that communicates with the outlet passageway 42 formed in the body member 12. A valve member 84c is located in the control chamber 78c and is centrally disposed to cooperate with the outlet passage 82c to admit or prevent the flow of fluid from the control chamber 78c through the insert member 56c. Attached to the valve member 84c for controlling its position, is a temperature-sensitive device which, in the preferred embodiment disclosed herein, is a bellows member 86c which is adapted to expand and contract in the axial direction. The bellows member is carried on its upper end by the lower surface of the bonnet 60c.

Similar to the embodiment disclosed in FIG. 2, the bellows member 86c carries a fluid having a boiling point somewhat less than that of water and can conveniently include a water and alcohol mixture. When the fluid in the bellows is in a liquid state, the bellows is in a contracted position and the valve member 84c is spaced from the outlet passage 82c. When the temperature in the control chamber 78c is sufficiently high, the fluid in the bellows 86c vaporizes and exerts a significantly higher pressure on the bellows which expands the bellows causing the valve member 84c to seat on the outlet passage 82c. The operation of this type of steam trap is generally similar to that disclosed in FIG. 2 of the drawing and reference is made to that description. It is noted, however, that the arrangement of the steam trap disclosed in FIG. 4 of the drawing is such that the insert assembly 14c is simplified and is more nearly analagous to those disclosed in FIGS. 1 and 3 of the drawing.

From the preceding description of several different steam traps in accordance with this invention, it should be clear that a single valve body member can be utilized with different insert assemblies to provide different steam traps. The sealing and thread arrangements between the insert assembly and the valve body member accommodate various insert configurations without requiring changes in the body member. Thus, if it is desired to replace a particular type of steam trap with a different type, the insert assembly may be removed and a different assembly substituted for it without necessitating any changes to the body member. Similarly, if it is desired to replace a particular insert assembly with the same type of insert assembly, the substitution can be made without requiring change or modification to the body member. It is also noted that if the insert assemblies are multi-part assemblies, replacement can be facilitated by use of a suitable retaining means between the various parts and by the use of retaining means for the sealing ring.

I claim:

1. An insert assembly located to be utilized with a valve body member to form a steam trap, said insert assembly comprising an insert member and a bonnet member joined together to form a control chamber, one of said members including a threaded portion and a wrenching configuration for cooperation with a tool to effect threaded engagement between said threaded portion and a threaded portion on said valve body member, a first bearing surface formed on said insert member; a skirt depending from said insert member about and below said first bearing surface, a first sealing ring held by said depending skirt, a second bearing surface formed adjacent said wrenching configuration for seating on a second sealing ring carried on an outer surface of said valve body member, an inlet passageway formed in said insert member for communicating between said first bearing surface and said control chamber, an outlet passageway formed in said insert member for communicating between said control chamber and an outer surface thereof, and valve means carried in said control chamber for controlling flow.

2. An insert assembly in accordance with claim 1 wherein said skirt is formed with retaining means for holding said first sealing ring said retaining means including a plurality of protuberances projecting radially inwardly.

3. An insert assembly in accordance with claim 2 wherein said insert member and said bonnet member carry groove configurations in joining surfaces and including a compressible ring located in said groove configurations formed in said insert member and said bonnet member.

4. An insert assembly in accordance with claim 1 wherein said bonnet member includes said threaded portion and said wrenching configuration for cooperation with said tool.

5. An insert assembly in accordance with claim 4 wherein said insert member and said bonnet member are removably retained in assembled relationship.

6. An insert assembly in accordance with claim 5 wherein a retaining ring is located in groove configurations formed in said insert member and said bonnet member.

7. An assembly adapted to be utilized with a threaded valve body to form a steam trap, said assembly comprising an insert member and a body member connected to said insert member forming therewith an enclosed control chamber, said bonnet member having a threaded portion and a wrenching configuration portion for cooperation with a tool to effect threaded engagement between said threaded portion and a threaded recess in the valve body member, a first bearing surface formed on said insert member for seating on a first sealing ring in the threaded recess of said valve body member, a second bearing surface formed adjacent said wrenching configuration for seating on a second sealing ring carried on an outer surface surrounding the threaded recess of said valve body member, a groove formed in said insert member and said bonnet member connecting surfaces, a locking member positioned in said insert member and said bonnet member grooves thereby locking said members connection, an inlet passageway formed in said insert member extending from the midpoint of said first bearing surface through said insert member for communicating between said first bearing surface and said control chamber, an outlet passageway formed in said insert member for communicating between said control chamber and an outer surface of said insert member, and valve means in said control chamber in engagement with said insert member to control flow through said outlet passageway.

* * * * *

UNITED STATES PATENT AND TRADEMARK OFFICE
CERTIFICATE OF CORRECTION

PATENT NO. : 4,387,732

DATED : June 14, 1983

INVENTOR(S) : Heinz K. Hetz

It is certified that error appears in the above-identified patent and that said Letters Patent is hereby corrected as shown below:

In Claim 1, column 10, line 60: "located" should be --adapted--

Signed and Sealed this

Fourth Day of October 1983

[SEAL]

Attest:

GERALD J. MOSSINGHOFF

Attesting Officer

Commissioner of Patents and Trademarks